(12) United States Patent
De Groot et al.

(10) Patent No.: US 6,744,522 B2
(45) Date of Patent: Jun. 1, 2004

(54) INTERFEROMETER FOR MEASURING THE THICKNESS PROFILE OF THIN TRANSPARENT SUBSTRATES

(75) Inventors: Peter J. De Groot, Middletown, CT (US); Leslie L. Deck, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 130 days.

(21) Appl. No.: 10/061,238

(22) Filed: Feb. 1, 2002

(65) Prior Publication Data

US 2002/0145739 A1 Oct. 10, 2002

Related U.S. Application Data

(60) Provisional application No. 60/265,852, filed on Feb. 1, 2001.

(51) Int. Cl.$^7$ .................................................. G01B 9/02
(52) U.S. Cl. ........................................ 356/503; 356/512
(58) Field of Search ................................ 356/489, 495, 356/512, 503, 515, 514, 513

(56) References Cited

U.S. PATENT DOCUMENTS 5,488,477 A * 1/1996 de Groot .................... 356/514

OTHER PUBLICATIONS

Ai, C. and Wyant, J.C., "Testing and optical window of a small wedge angle: effect of multiple reflections" Appl. Opt. 32(25)(1993).*
Deck, L., "Multiple Surface Phase Shifting Interferometry" Proc. SPIE, 4451, p:424–430 (2001).*
Okada, K. et al., "Separate measurements of surface shapes and refractive index inhomogeneity of an optical element using tunable–source phase shifting interferometry" Appl. Opt. 29 (22), 3280–3285 (1990).*

* cited by examiner

Primary Examiner—Frank G. Font
Assistant Examiner—Patrick J Connolly
(74) Attorney, Agent, or Firm—Fish & Richardson P.C.

(57) ABSTRACT

An method for measuring an optical thickness of a test object, the method includes: interfering a first optical wave front from the test object and a second optical wave front from a reference surface to produce an interference signal; for a selected location on the test object, obtaining an interference pattern of the test object at a first wavelength $\lambda_1$; for the selected location, calculating a first estimate of the optical thickness from the interference pattern recorded at wavelength $\lambda_1$; for the selected location obtaining an interference pattern of the test object at a second wavelength $\lambda_2$; for the selected location, calculating a second estimate of the optical thickness from the interference pattern recorded at wavelength $\lambda_2$; and for the selected location, calculating a third estimate of the optical thickness by combining the first and second estimates of optical thickness.

13 Claims, 3 Drawing Sheets

- Calibrate the cavity at $\lambda_1$ by computing an optical path length profile $OPL_{CAL}(x)$ for each pixel x.
    o Scan the phase by changing displacement, d, of TF.
    o Store the interference pattern (intensity vs d) for each pixel.
    o Compute the phase profile $\theta(x)$ from the interference pattern.
    o Compute $OPL_{CAL}(x)$ from $\theta(x)$.

10

- Place test object into cavity.
- Compute an optical path length profile $OPL_1(x)$ using an interference pattern recorded for each pixel at wavelength $\lambda_1$.

20

- Compute a first estimate of optical thickness, $Z_1(x)$, $$Z_1(x) = \frac{n}{2(n-1)}[OPL_1(x) - OPL_{CAL}(x)]$$

30

- Change wavelength to $\lambda_2 = \lambda_1 \pm \lambda_1^2/4nT$.
- Compute an optical path length profile $OPL_2(x)$ using an interference pattern recorded for each pixel at wavelength $\lambda_2$.

40

- Compute second estimate of optical thickness, $$Z_2(x), Z_2(x) = \frac{n}{2(n-1)}[OPL_2(x) - OPL_{CAL}(x)]$$

50

- Compute estimate for optical thickness profile, $\overline{Z}(x)$, $$\overline{Z}(x) = \frac{1}{2}(Z_1(x) + Z_2(x))$$

60

FIG. 2

INTERFEROMETER FOR MEASURING THE THICKNESS PROFILE OF THIN TRANSPARENT SUBSTRATES

CROSS-REFERENCE TO RELATED APPLICATIONS

This application claims priority from U.S. provisional patent application No. 60/265,852, filed Feb. 1, 2001, the contents of which is incorporated herein by reference.

BACKGROUND

Optical thickness is the physical thickness multiplied by the index of refraction of a material. Not only is optical thickness important in many applications but also the measurement of optical thickness often must be very accurate. For example, plates used as filters in Fabry-Perot etalons often must have an optical thickness that is accurate to within a few nanometers.

A known technique for optical thickness testing is the so-called transmitted wavefront test, in which the object is placed inside a Fizeau cavity between a transmission flat (TF) and a reference flat (RF). However, high precision measurement of optical thickness of substrates or similar optical structures having two plane-parallel surfaces that are very close to each other (e.g. <1 mm) can be difficult. This measurement is contaminated by unwanted secondary reflections between the object surfaces that produce second and higher order errors. These errors are increasingly difficult to suppress the thinner the sample is.

SUMMARY

In general, in one aspect the invention features a method for measuring an optical thickness of a test object. The method includes: interfering a first optical wave front from the test object and a second optical wave front from a reference surface to produce an interference signal; for a selected location on the test object, obtaining an interference pattern of the test object at a first wavelength $\lambda_1$; for the selected location, calculating a first estimate of the optical thickness from the interference pattern recorded at wavelength $\lambda_1$; for the selected location obtaining an interference pattern of the test object at a second wavelength $\lambda_2$; for the selected location, calculating a second estimate of the optical thickness from the interference pattern recorded at wavelength $\lambda_2$; and for the selected location, calculating a third estimate of the optical thickness by combining the first and second estimates of optical thickness.

Embodiments of the method may include any one of the following features.

The method may include performing the processes above for each location of a two-dimensional array of locations to generate an estimate of optical thickness for each location of the two-dimensional array of the test object.

The third estimate of the optical thickness may be calculated by averaging the first and second estimates of optical thickness.

The wavelengths $\lambda_1$ and $\lambda_2$ may be selected so that errors cancel when the first and second estimates of optical thickness are combined.

The wavelength $\lambda_2$ may depend on $\lambda_1$, an approximate physical thickness of the test object, T, and the index of refraction n of the test object. The wavelength $\lambda_2$ may satisfy the relationship $\lambda_2 = \lambda_1 \pm (2m+1)\lambda_1^2/4nT$ where m is an integer. Calculating a third estimate of the optical thickness may include averaging the first and second estimates of optical thickness. The processes of the method may be performed for each location of a two-dimensional array of locations to generate an estimate of optical thickness profile for each location of the two-dimensional array of the test object. The first and second optical wavefronts may have a relative phase. An interference pattern may be obtained by: scanning the relative phase of the first and second optical wavefronts over a predetermined range of phase shifts; while scanning the relative phase, monitoring at the selected location, a change in the interference signal as a function of the phase shifting; and storing as the interference pattern the monitored change in the interference signal for the selected location. The test object and the reference surface may have a relative separation and scanning the relative phase of the first and second optical wavefronts may include mechanically changing the separation between the reference surface and the test object. Interfering a first optical wave front from the test object and a second optical wavefront from a reference surface may use a Fizeau interferometer. The third estimate of optical thickness may combine only the first and second estimates of optical thickness.

Finally, in another aspect, the invention may feature a program stored on a computer-readable medium for causing a computer to perform the functions of: obtaining an interference pattern for a selected location on a test object at a first wavelength $\lambda_1$; for the selected location, calculating a first estimate of the optical thickness from the interference pattern recorded at wavelength $\lambda_1$; for the selected location obtaining an interference pattern of the test object at a second wavelength $\lambda_2$; for the selected location, calculating a second estimate of the optical thickness from the interference pattern recorded at wavelength $\lambda_2$; and for the selected location, calculating a third estimate of the optical thickness by combining the first and second estimates of optical thickness.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2 is a flow chart of the technique.

Like reference symbols in the various drawings indicate like elements.

DETAILED DESCRIPTION

The described embodiment implements a technique for optical thickness profiling of thin transparent objects. It involves measuring optical path length profiles at two discrete wavelengths to produce two estimates of the thickness and then averaging these two estimates to produce a more accurate estimate of the actual optical thickness. Typically, both estimates will have errors due to the effects of the spurious reflections mentioned earlier. But the two wavelengths at which the measurements are made can be chosen so that the errors in the two estimates of optical thickness have opposite signs and will cancel each other when added to calculate the an average.

Figure 1:
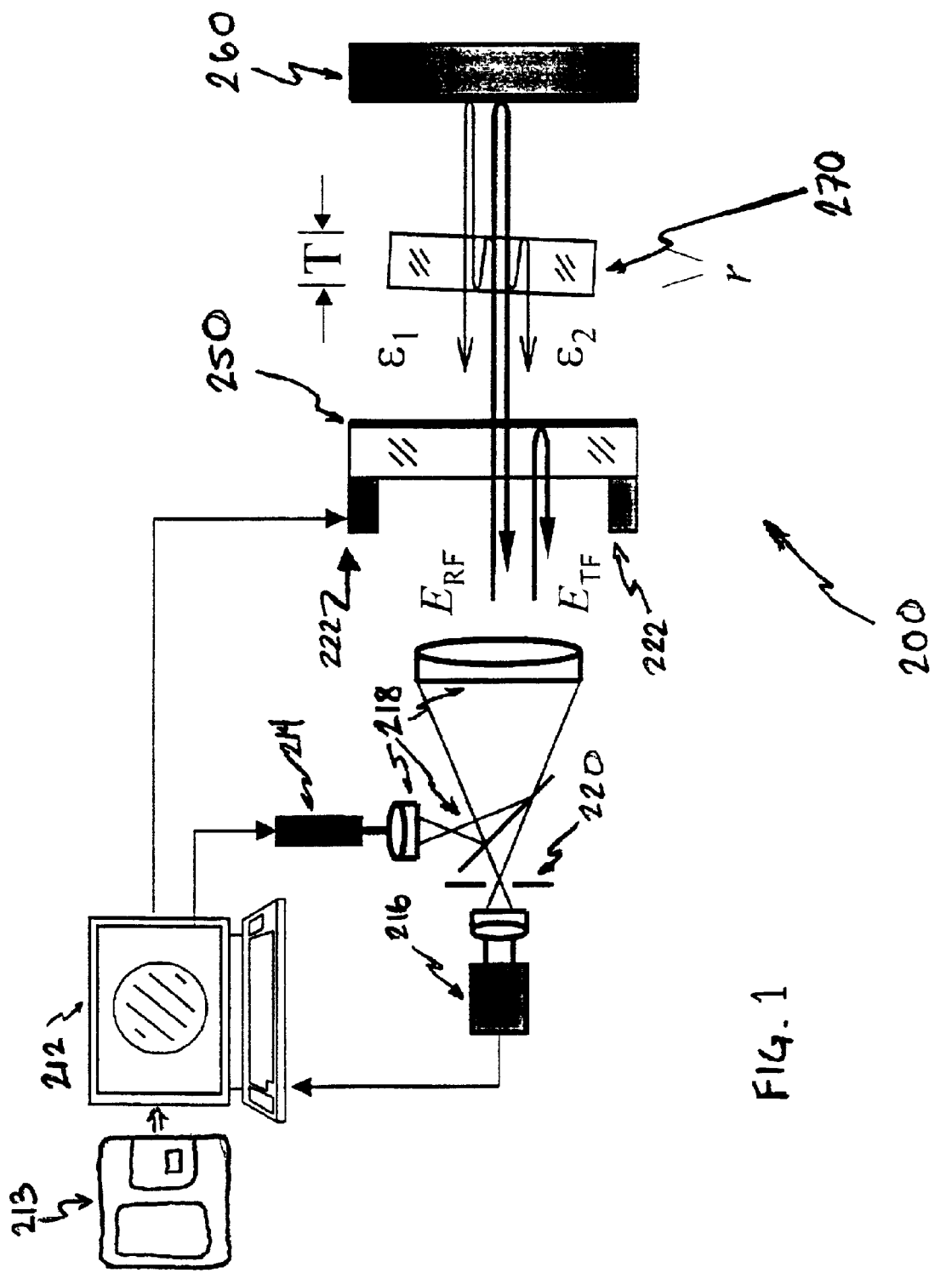
FIG. 1 is a schematic of a Fizeau interferometer with an object in the beam path with primary electric fields and spurious reflected fields shown.

Referring to FIG. 1, in the implementation to be described these measurements are performed using a Fizeau interferometer 200, which includes a transmission flat 250 and a reference flat 260 forming a cavity in which a test object 270 is placed. A piezoelectric drive (PZT) 222 controls the position of transmission flat 250 along the optical axis of the interferometer and is used to change the phase of the interference signal. A tunable laser 214 supplies a coherent light beam through an optical system 218 to the cavity and a charge coupled device array (CCD) 216 monitors the interference signal that is generated by the Fizeau cavity. Computer 212 controls the frequency of tunable laser 214, drives PZT 222 to vary the position of the transmission flat and thereby vary the size of the cavity, and records the light intensity of the interference signal at each pixel location of CCD array 216 as a function of the cavity size. Computer readable medium 213 contains the software programs that obtain the data and process the data. Optical system 218 includes the optics to guide the laser light to the cavity, optics to guide the laser light from the transmission flat to the CCD and an aperture 220 that restricts the angle of light that reaches the CCD.

The light intensity at the CCD results from interference between the first-order reflected electric fields $E_{TF}$ and $E_{RF}$ as shown in FIG. 1. These electric fields interfere to create an intensity variation at the CCD proportional to:

$$I(x)=1+V\cos[\theta(x)] \qquad \text{Eqn. (1)}$$

where V is the fringe visibility. $\theta(x)$ is the phase difference between $E_{TF}$ and $E_{RF}$. The variable x represents the pixel location within the 2 dimensional CCD array The optical path length profile, OPL(x), is obtained by first recording the intensity at each pixel as a function of position d of the transmission flat (i.e., I(x,d)). This variation in intensity as a function of transmission flat (TF) displacement is the interference pattern. This interference pattern is used to calculate a phase profile $\theta(x)$. This calculation can be achieved, for example, by Fourier transforming the interference pattern with respect to TF displacement, the resulting complex phase of this transform is $\theta(x)$. In addition, phase-shifting algorithms can be applied to calculate a phase profile $\theta(x)$ from the interference pattern. Note that there is an inherent 2-$\pi$ ambiguity in the phase measurement and the field dependence of this ambiguity is eliminated by using one of a number of different standard phase connect or phase unwrapping procedures (for a discussion of these unwrapping techniques see D. C. Ghiglia and M. D. Pritt "Two dimensional phase unwrapping: Theory, algorithms, and software" John Wiley and Sons, Inc., New York, 1998). The resulting phase unwrapped $\theta(x)$ is linearly proportional to the round-trip optical path length from the TF to the RF and thus once $\theta(x)$ is determined, the optical path length OPL(x) is given by:

$$OPL(x) = \frac{\lambda \theta(x)}{2\pi}. \qquad \text{Eqn. (2)}$$

where $\lambda$ is the laser wavelength.

In this embodiment, the user generates an interference pattern for each pixel location by changing the reference flat position with the PZT 222, i.e., by changing the cavity length. There are, of course, other ways to change the phase so as to obtain the required data other than by the mechanical phase shifting method just mentioned. For example, instead of changing cavity length, one could instead change the frequency of the laser light, e.g. by frequency tuning the laser over a small range such as is done in wavelength-tuned phase shifting interferometry with a 1 GHz bandwidth for a 100 mm cavity. Still other methods are known to persons skilled in the art.

Referring to FIG. 2, the technique for generating a more accurate measurements of the optical thickness of a test object involves first calibrating the interferometer and then with the test object present taking two profile measurements, each one at a different wavelength. The details of those steps will now be described.

During the initial system calibration, the operator makes the measurements without placing the test object in the cavity. In other words, the operator mechanically shifts the phase of the interference signal and while doing this the computer monitors and stores the resulting interference profile for each sensor. Then, using the approach described above, the computer computes the optical path length profile, $OPL_{CAL}(x)$, for the Fizeau cavity without the test object (Step 10).

After calibrating the interferometer, the operator measures the transmitted wavefront profile with the test object in the interferometer cavity. The test object 270 is put into the interferometer with a small tilt of about 0.5°. An interference pattern is recorded and an optical path length profile, $OPL_1$(x), is calculated (Step 20).

The tilt of the test object directs the primary reflections from the test object surface off axis Then, aperture 220, which restricts the angle of admitted light to the CCD, blocks the off axis reflections, i.e., the primary reflections from the test object, so that they do not reach CCD 216 and interfere with the signal of interest.

Figure 3:
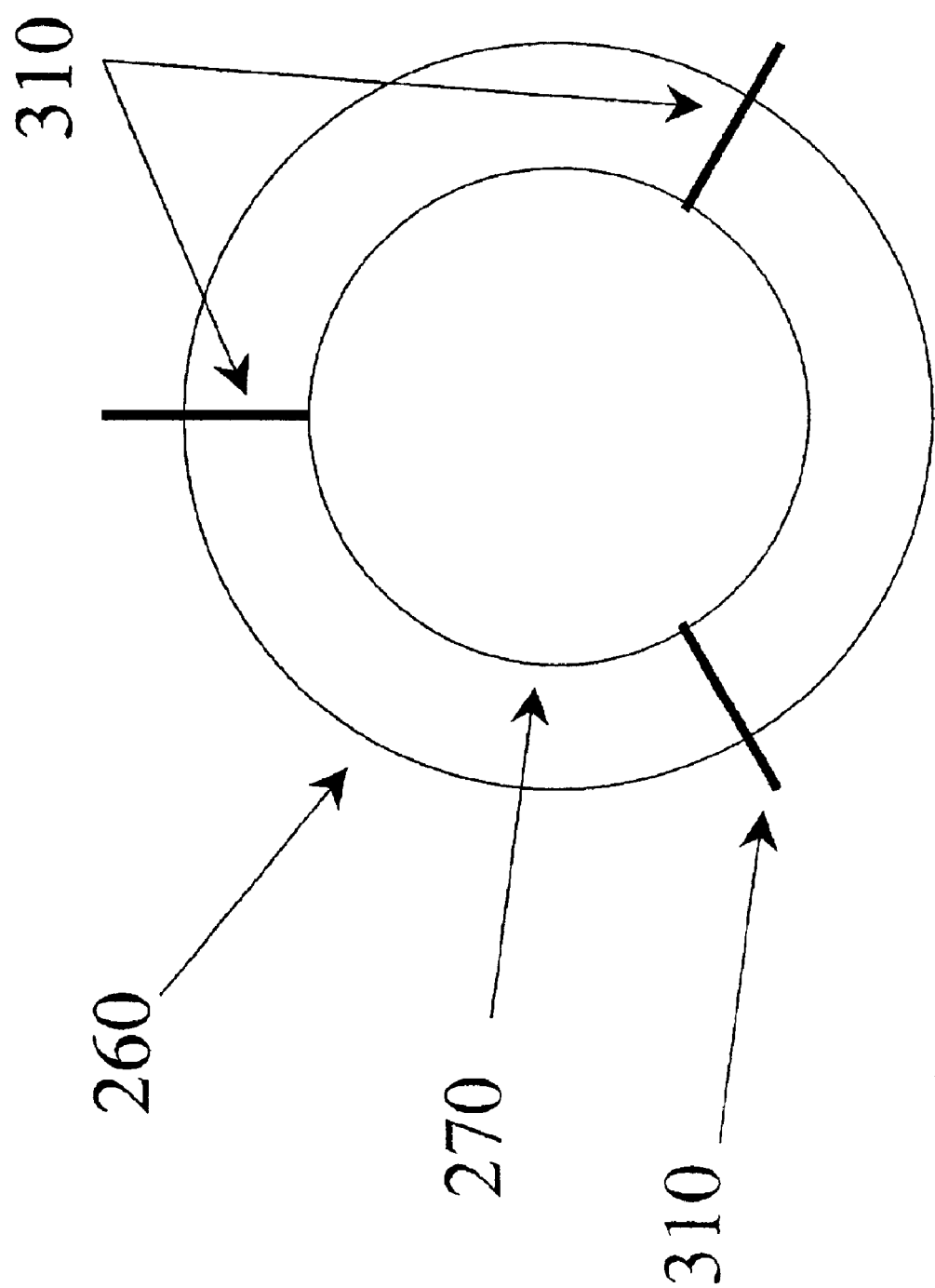
FIG. 3 shows the test object relative to the field of view of the interferometer.

It is important to use transmission and reference flats that are large enough in diameter so that the test object does not span the entire field of view. For example, the measurement configuration shown in FIG. 3 might be appropriate. FIG. 3 shows test object 270 being held totally within the field of view of the interferometer by the support arms 310. The test object does not obscure the view of the entire reference flat 260. This leaves sensors (or pixels) in the region outside of the outer periphery of the test object unobscured by the test object. Those sensors provide reference signal that can be used to eliminate or take into account any changes that might occur in the set up between measurements. Placing the test object into the interferometer cavity could disturb the original setup by introducing tips or tilts in the reference flat. If this is not taken into account, the resulting measurements of the optical thickness will have errors. By obtaining measurement data on the unobstructed parts of the cavity while also measuring the test object, the changes in the reference flat can be detected and taken into account.

After computing the optical path length with the test object in the cavity, the computer computes the difference between the two path lengths ($OPL_1$ and $OPL_{CAL}$) yielding a first estimate of the optical thickness profile (Step 30). The estimate of the optical thickness profile, $Z_1(x)$, is $$Z_1(x) = \frac{n}{2(n-1)}[OPL_1(x) - OPL_{CAL}(x)]. \qquad \text{Eqn. (3)}$$

n is the index of refraction of the test object 270. As noted above, there are errors in the estimate $Z_1(x)$ due to the two spurious electric fields $\epsilon_1$, $\epsilon_2$ resulting from internal reflections between the front and back object surfaces as shown in FIG. 1.

The magnitude of these errors can be appreciated through the following analysis. For thin substrates (e.g. <1 mm) and nearly parallel TF and RF (e.g. <10-$\mu$rad wedge), the spurious electric fields are nearly identical in phase and amplitude and we can set them to a common value $\epsilon$.

$$\epsilon_1(x) \approx \epsilon_2(x) \equiv \epsilon(x) \qquad \text{Eqn. (4)}$$

The phase of the spurious fields relative to the desired field reflected from the RF is:

$$\alpha(x) = arg[\epsilon(x)] - arg[E_{RF}(x)] \qquad \text{Eqn. (5)}$$

which evaluates to:

$$\alpha(x) = \frac{4\pi}{\lambda} Z(x) \qquad \text{Eqn. (6)}$$

where Z is the field-dependent optical thickness profile. The relative amplitude of the error term is:

$$|\epsilon(x)| = r^2 |E_{RF}(x)|. \qquad \text{Eqn. (7)}$$

where r is the amplitude reflectivity of test object 270. As a result, the spurious electric fields $\epsilon_1$, $\epsilon_2$ introduce an error in the measured optical path difference given by $$\delta OPL(x) \approx \frac{\lambda}{\pi} r^2 \sin(\alpha(x)). \qquad \text{Eqn. (8)}$$

For a nominal laser wavelength of 633 nm and an amplitude reflectivity r of 20% for the object surfaces (typical of BK7 and fused silica glass), the peak-valley round-trip optical path error is 16 nm; This is too large for precision testing.

Having obtained the first estimate of the optical thickness, the operator tunes the laser in wavelength an amount $\Delta\lambda$ sufficient to change the relative phase a defined in Eqn.(6) by $\pm\pi$. The required shift is $$\Delta\lambda = -\lambda^2/4nT \qquad \text{Eqn. (9)}$$

which is equivalent to an optical frequency shift of $$\Delta v = c/4nT. \qquad \text{Eqn. (10)}$$

T is the nominal physical thickness of the test object. The user obtains a value for T from, for example, previous metrology measurements or the computer computes an estimate for T from the average of the values across the field x of the first estimate of optical thickness $Z_1(x)$. As a rule of thumb, most glasses have an index of n~1.5, for which a 0.1-mm thick substrate would require a $\Delta v = 500$-GHz frequency shift or a $\Delta\lambda = 0.7$-nm wavelength shift.

Having appropriately tuned the laser, the user collects data at this second wavelength $\lambda_2 = \lambda_1 \pm \Delta\lambda$ and computes a second optical length profile $OPL_2(x)$ (Step 40). Due to the periodicity of Eqn. 6, the second wavelength can be any of the wavelengths satisfying the relation $\lambda_2 = \lambda_1 \pm (2m+1)\Delta\lambda$ where m is an integer but the smallest change in wavelength (ie m=0) is often the simplest to implement.

Using the second optical path length measurement, $OPL_2(x)$, and the calibration data, $OPL_{CAL}(x)$, the computer computes a second optical thickness profile $Z_2(x)$ (Step 50). $Z_2(x)$ is given by $$Z_2(x) = \frac{n}{2(n-1)} [OPL_2(x) - OPL_{CAL}(x)]. \qquad \text{Eqn. (11)}$$

Similar to the discussion of the first estimate of optical thickness, the spurious reflections introduce errors into the optical thickness measurement $Z_2(x)$ but because of the choice of the second wavelength these errors have opposite sign as compared to $Z_1(x)$.

In the final step, the computer averages the two optical thickness profiles to produce a final estimate of optical thickness (Step 60). The average optical thickness $\overline{Z}(x)$ is given by $$\overline{Z}(x) = \frac{Z_1(x) + Z_2(x)}{2}. \qquad \text{Eqn. (12)}$$

Because the error terms in the two estimates $Z_1(x)$ and $Z_2(x)$ have equal yet opposite error contributions, these errors cancel when averaged and the average optical thickness $\overline{Z}(x)$ has substantially reduced error. Although the analysis above is made assuming a small optical wedge of the RF and TF, and for small reflectivity of the test object, and for a thin test object, the error suppression discussed here is still applicable outside of these assumptions but the error suppression as described could become less effective.

In the described embodiment, we use as the tunable laser source the NewFocus model 6304 with a coarse tuning range of 632–637 nm and a wavelength tuning resolution of 0.02 nm. This laser has a continuous fine-tuning range of 70 GHz (0.09 nm). The coarse tuning range is large enough to provide an appropriate wavelength change $\Delta\lambda$ for thin substrates. In the approach described above, we obtained two estimates for optical thickness at two distinct wavelengths and then averaged the results to obtain a measurement of the optical thickness that has reduced second order errors. By obtaining more than two measurements of the optical thickness, each at a different wavelength, it would be possible to reduce higher order errors, e.g. fourth order errors. The above-described technique was used to produce more accurate measurements of the optical thickness of very thin transparent objects using a Fizeau interferometer. But the technique is also applicable to other types of measurements and to other interferometry systems.

The data capture and analysis steps described above are implemented through software programs that are stored on computer-readable media 213 (e.g. CD ROM, floppy disks, RAM, etc.) and are run on the computer. How much of the process is computer automated is simply a design consideration as is the timing of the computational steps. For example, immediately after the capture of the data, the computer can compute the appropriate results before the next set of data is captured. Alternatively, all of the data can be first captured and stored and at the computations can be started after all of the measurement data has been obtained. In addition, since in the described embodiment only two wavelengths of laser light are required, these could be supplied by two appropriately selected fixed wavelength lasers instead of by a tunable laser as described.

Other aspects, advantages, and modifications are within the scope of the following claims.

What is claimed is:

1. A method for measuring an optical thickness of a test object, the method comprising:
   (a) interfering a first optical wavefront from the test object and a second optical wavefront from a reference surface to produce an interference signal,
   (b) for a selected location on the test object, obtaining an interference pattern of the test object at a first wavelength $\lambda_1$;
   (c) for the selected location, calculating a first estimate of the optical thickness from the interference pattern recorded at wavelength $\lambda_1$;

(d) for the selected location obtaining an interference pattern of the test object at a second wavelength $\lambda_2$;

(e) for the selected location, calculating a second estimate of the optical thickness from the interference pattern recorded at wavelength $\lambda_2$; and (f) for the selected location, calculating a third estimate of the optical thickness by combining the first and second estimates of optical thickness.

2. The method of claim 1 further comprising performing processes (a) through (f) for each location of a two-dimensional array of locations to generate an estimate of optical thickness for each location of the two-dimensional array of the test object.

3. The method of claim 1 wherein calculating a third estimate of the optical thickness by combining the first and second estimates of optical thickness comprises averaging the first and second estimates of optical thickness.

4. The method of claim 1 further comprising selecting $\lambda_1$ and $\lambda_2$ so that errors cancel when the first and second estimates of optical thickness are combined.

5. The method of claim 1 wherein $\lambda_2$ depends on $\lambda_1$, an approximate physical thickness of the test object, T, and the index of refraction n of the test object.

6. The method of claim 5 wherein $$\lambda_2 = \lambda_1 \pm (2m+1)\lambda_1^2/4nT$$

and m is an integer.

7. The method of claim 6 wherein calculating a third estimate of the optical thickness by combining the first and second estimates of optical thickness comprises averaging the first and second estimates of optical thickness.

8. The method of claim 7 wherein performing processes (a) through (f) of claim 1 for each location of a two-dimensional array of locations to generate an estimate of optical thickness profile for each location of the two-dimensional array of the test object.

9. The method of claim 8 wherein the first and second optical wavefronts have a relative phase, wherein obtaining an interference pattern comprises:

scanning the relative phase of the first and second optical wavefronts over a predetermined range of phase shifts;

while scanning the relative phase, monitoring at the selected location, a change in the interference signal as a function of the phase shifting; and storing as the interference pattern the monitored change in the interference signal for the selected location.

10. The method of claim 9 wherein the test object and the reference surface have a relative separation and scanning the relative phase of the first and second optical wavefronts comprises mechanically changing the separation between the reference surface and the test object.

11. The method claim 10 wherein interfering a first optical wave front from the test object and a second optical wavefront from a reference surface uses a Fizeau interferometer.

12. The method of claim 11 wherein the third estimate of optical thickness combines only the first and second estimates of optical thickness.

13. A program stored on a computer-readable medium for causing a computer to perform the functions of:

(a) obtaining an interference pattern for a selected location on a test object at a first wavelength $\lambda_1$;

(b) for the selected location, calculating a first estimate of the optical thickness from the interference pattern recorded at wavelength $\lambda_1$;

(c) for the selected location obtaining an interference pattern of the test object at a second wavelength $\lambda_2$;

(d) for the selected location, calculating a second estimate of the optical thickness from the interference pattern recorded at wavelength $\lambda_2$; and (e) for the selected location, calculating a third estimate of the optical thickness by combining the first and second estimates of optical thickness.

* * * * *

UNITED STATES PATENT AND TRADEMARK OFFICE
CERTIFICATE OF CORRECTION

PATENT NO.   : 6,744,522 B2
DATED        : June 1, 2004
INVENTOR(S)  : Peter De Groot and Leslie L. Deck It is certified that error appears in the above-identified patent and that said Letters Patent is hereby corrected as shown below:

<u>Title page,</u>
Item [56], References Cited, OTHER PUBLICATIONS, "Ai, C." reference, replace "and" 2nd occurence, with -- an --

Signed and Sealed this

Nineteenth Day of April, 2005

JON W. DUDAS
*Director of the United States Patent and Trademark Office*